US00RE34773E

United States Patent [19]

Dombrowski

[11] E Patent Number: Re. 34,773

[45] **Reissued Date of Patent: * Nov. 1, 1994**

[54] DRIVER ALERTING DEVICE

[76] Inventor: Anthony E. Dombrowski, 130 32 Mullen Cir., Omaha, Nebr. 68144

[ * ] Notice: The portion of the term of this patent subsequent to Jul. 2, 2008 has been disclaimed.

[21] Appl. No.: 552,555

[22] Filed: Jul. 16, 1990

Related U.S. Patent Documents

Reissue of:

[64] Patent No.: 4,803,488
Issued: Feb. 7, 1989
Appl. No.: 895,537
Filed: Aug. 13, 1986

U.S. Applications:

[63] Continuation of Ser. No. 579,160, Feb. 10, 1984, abandoned.

[51] Int. Cl.[5] ..... G08G 1/00

[52] U.S. Cl. ..... 340/904; 340/903; 340/901; 340/436; 180/167; 180/169

[58] Field of Search ..... 340/904, 903, 901, 436, 340/435, 932.2; 342/61, 41, 29, 27, 70, 455; 180/167, 271, 169

[56] References Cited

U.S. PATENT DOCUMENTS

| | | | |
|---|---|---|---|
| 2,974,304 | 3/1961 | Nordlund . | |
| 3,226,673 | 12/1965 | Cudworth . | |
| 3,697,985 | 10/1972 | Faris et al. . | |
| 3,732,555 | 5/1973 | Strenglein | 340/904 |
| 3,760,415 | 9/1973 | Holmstrom et al. . | |
| 3,781,879 | 12/1973 | Staras et al. . | |
| 3,789,950 | 2/1974 | Strenglein . | |
| 4,001,823 | 1/1977 | Matsui . | |
| 4,015,232 | 3/1977 | Sindle | 340/904 |
| 4,260,980 | 4/1981 | Bates . | |
| 4,278,962 | 7/1981 | Lin | 340/904 |
| 4,300,116 | 11/1981 | Stahovec . | |
| 4,356,489 | 10/1982 | Hirota | 340/904 |
| 4,358,759 | 11/1982 | Stewart et al. . | |
| 4,404,541 | 9/1983 | Kodera et al. . | |
| 4,528,563 | 7/1985 | Takeuchi | 340/904 |
| 4,543,577 | 9/1985 | Tachibana et al. . | |

OTHER PUBLICATIONS

Harokopus, W. P., "Application Of Radar To Automobile Control And Sensing", Second International Technical Conference On Experimental Safety Vehicles (Jan. 1971), Sindelfingen, Germany, U.S. Dept. of Transportation, National Highway Traffic Safety Administration.

Bureau of Mines Publication published in 1986 titled "*Improved Back-Up Alarm Technology for Mobile Mining Equipment*".

Harokopus, W. P., "Application Of Radar To Automobile Control And Sensing", Proceedings Of The IEEE-GMTT International Microwave Symposium Jan. 1971.

Grimes et al., "Automotive Radar: A Brief Review", Proceedings Of The IEEE, vol. 62, No. 6, Jun. 1974, pp. 304–322.

Chapter 3 of Introduction To Radar Systems, "CW and Frequency-Modulated Radar", McGraw-Hill, Inc. (1962), pp. 68–73 and 79–85.

U.S. Department of Interior, Bureau of Mines, Fiscal Year 1980 Fourth Quarter Progress And Annual Summary Report, And Work Plan Jan. 1981.

*Primary Examiner*—Donnie L. Crosland
*Attorney, Agent, or Firm*—Sherman and Shalloway

[57] ABSTRACT

A driver alerting device includes a transceiver adapted for mounting at the rearward end of a vehicle for directing its wave output rearwardly of the vehicle. Return wave signals for many objects within the transceiver range are picked up and supplied to the transceiver by an antenna. Any resultant doppler shift signal is amplified for driving an audio alarm adapted for placement within the passenger compartment of the vehicle. The circuit is adapted for electrical connection to the back-up light circuit of the vehicle for activation only when the vehicle transmission is engaged in reverse gear.

24 Claims, 2 Drawing Sheets

AS AMENDED BY REISSUE

DRIVER ALERTING DEVICE

Matter enclosed in heavy brackets [ ] appears in the original patent but forms no part of this reissue specification; matter printed in italics indicates the additions made by reissue.

This application is a continuation of application Ser. No. 579,160, filed Feb. 10, 1984, now abandoned.

BACKGROUND OF THE INVENTION

The present invention is directed generally to a device for alerting the driver of a rearwardly moving vehicle to the presence of any object in close range behind the vehicle. More particularly, the present invention is directed to a micro-wave radar device using the doppler shift principle to detect the presence of a moving target within the transceiver range.

Drivers of difficulty with backing up their vehicles. Whereas this is due partly to the different steering response of a rearwardly moving vehicle, most backing-up accidents are due to the driver's limited visibility. Many trucks have a considerable blind spot directly rearwardly of the vehicle which is not visible through side mounted mirrors. But even in smaller trucks and passenger cars with rear windows, there may be blind spots at the rearward corners of the vehicle and below the driver's line of sight.

Devices have previously been known for detecting the presence of objects behind a vehicle but such devices have not achieved widespread usage. Devices which provide an audible alarm directed rearwardly of the vehicle are ineffective if a child, for example, in the path of the vehicle does not react to the alarm and if the vehicle driver does not hear the alarm. Certainly an external alarm will not remove objects from the path of the vehicle.

Accordingly, an object of the invention is to provide an improved device for alerting the driver of a rearwardly moving vehicle to the presence of a person or object within a short range distance behind the vehicle.

Another object is to provide such a device with a remote audible alarm suitable for placement within the passenger compartment of a vehicle.

Another object is to provide such a device which employs micro-wave radar technology.

Another object is to provide a driver alerting device which may be easily electrically and mechanically connected to a vehicle.

Finally, an object is to provide a driver alerting device which is economically to manufacture, simple and rugged in construction and efficient in operation.

SUMMARY OF THE INVENTION

The driver alerting device o the present invention includes a transceiver adapted for mounting at the rearward end of a vehicle for directing its wave output rearwardly of the vehicle. Return wave signals from any object within the short transceiver range behind the vehicle are supplied to the transceiver through an antenna connection. Any resultant doppler shift signal is amplified for driving the audio alarm. The circuit of the device is adapted for electrical connection to the back-up light circuit of a vehicle for activation only when the vehicle transmission is engaged in reverse gear.

The driver alerting device thus immediately sounds an alarm when any moving or stationary object is detected within the short transceiver range behind a rearwardly moving vehicle on which it is installed. Even when the vehicle is stationary, but with the back-up lights activated, the device will signal the presence of any moving object within the transceiver range. Because the device operates by micro-wave radar, it is unaffected by noise, light, or weather-conditions such as snow, rain, heat and cold.

DESCRIPTION OF THE PREFERRED EMBODIMENT

Figure 1:
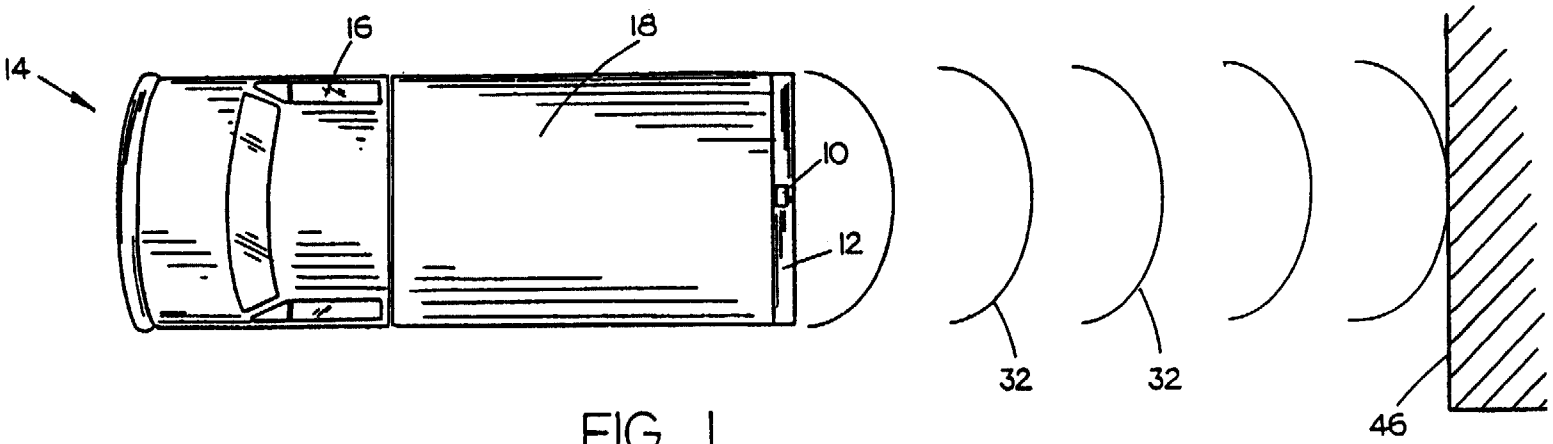
FIG. 1 is a diagrammatic top plan view of the driver alerting device installed on a vehicle.

The driver alerting device of the present invention is indicated generally at 10 in FIG. 1 installed on the rear bumper 12 of a truck 14 having a passenger compartment 16 situated forwardly of box 18. Device 10 operates by micro-wave radar using the doppler shift principle to detect the presence of a moving target within the transceiver range.

Figure 2:
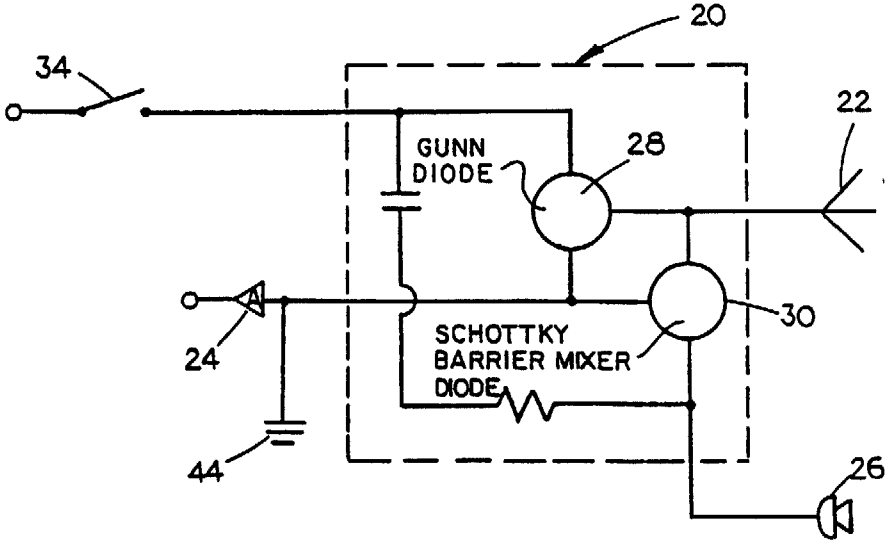
FIG. 2 is an electrical schematic circuit diagram of the driver alerting device; [and]
Figure 2A:
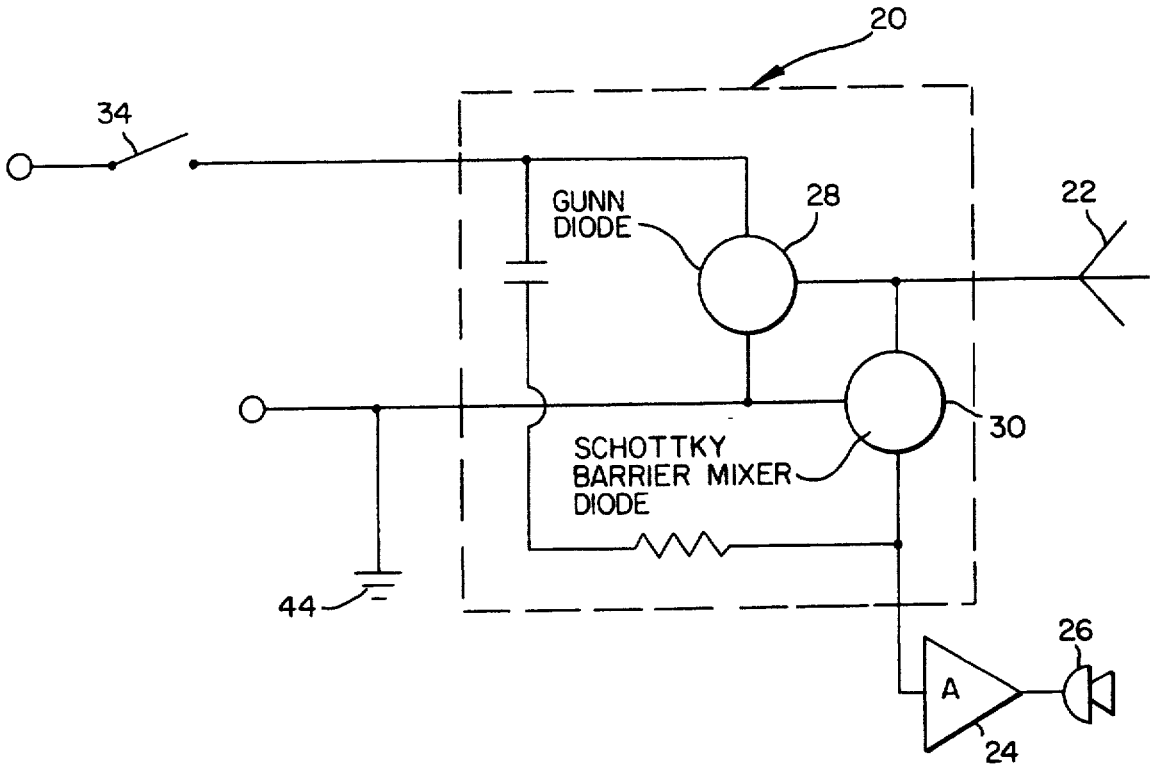
*FIG. 2A is an electrical schematic circuit diagram of the driver alerting device; and*

The operating elements of the device 10 are wholly electronic and are shown in [FIG. 2] *FIG. 2A* as including a transceiver 20, an antenna 22, an intermediate frequency amplifier 24 and an audio alarm 26.

The transceiver 20 includes a gun diode 28 mounted in a wave guide cavity which acts as the transmitter and local oscillator, together with a schottky barrier mixer diode 30 for the receiver. Electromagnetic radiation transmitted from the gunn diode 28 is reflected back at the antenna by any object within the transceiver range. If that object is moving relative to the vehicle, the frequency shift of the wave reflected by the moving object is measured electronically and triggers activation of the alarm 26.

In the preferred embodiment, output frequency of the transceiver 20 is factory preset at 10.525 GIGA HERTZ. Power output is 5 milliwatts minimum. Operating voltage is 8 volts D.C. The resultant doppler frequency obtained is 31.39 HERTZ for each mile per hour of radio velocity. The transceiver is unaffected by the presence of magnetic fields, noise, light and varying weather conditions.

Antenna 22 may be provided as either a high gain antenna or low gain antenna. The high gain antenna is preferred for application with ¼ ton, ½ ton and 1 ton vehicles measuring 80 inches maximum in width. The low gain antenna is preferred on 1 ton and larger vehicles measuring 80 inches and greater in width. The range of the antennas is adjustable and my be user set to accommodate virtually any vehicle. This adjustment is incorporated in the intermediate frequency amplifier 24 and is accessible from the outside of the unit. Antenna 22 is preferably constructed of machined aluminum and is also preferably flange-mounted directly to the transceiver 20, thus eliminating the effects of noise and spurious response. Lines 32 in FIG. 1 illustrate an example of a typically adjusted wave pattern.

The intermediate frequency amplifier 24 is a solid state, multi-stage operational amplifier designed to amplify and shape the resultant doppler shift signal. The circuitry is card mounted and has built-in range and sensitivity controls. The amplifier is designed to interface with the existing reverse switch 34 ([FIG. 2] *FIG. 2A* ) in order to activate the circuit only during reverse operation of the vehicle. Reverse switch 34 is typically associated with the vehicle transmission and is incorporated into the back-up light circuit of the vehicle for illuminating the back-up lights whenever the vehicle transmission is engaged in reverse gear.

The audio alarm 26 is mounted interiorly of the passenger compartment 16 so as to be readily audible to the driver of the vehicle. Amplifier 24 drives both the audio alarm 26 and a light emitting diode mounted on the unit. The purpose of the light emitting diode is to aid in the adjustment of the unit in the event that the alarm is not audible to the one adjusting the unit at the rearward end of the vehicle.

Figure 3:
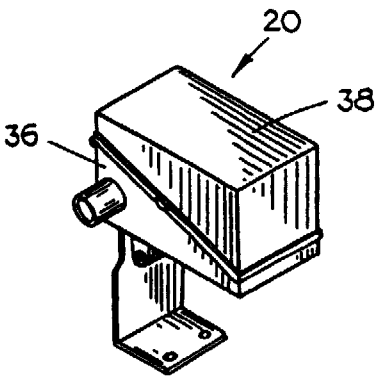
FIG. 3 is a perspective view of the transceiver housing of the device.

The transceiver 20 is shown in FIG. 3 as including a housing 36 which is diagonally sectioned to provide a pivotal top cover 38. The wave output from the transceiver 20 is transmitted outwardly through a rearwardly protruding channel section 40 on the rear wall of housing 36. A mounting flange 42 extends downwardly from the housing for ready attachment to a vehicle bumper or the like.

The circuitry is card mounted and all components ar treated with a conformal coating to prevent the effects of moisture and salt. Electrical hook-up to the vehicle is achieved via a splash-proof four circuit connector mounted on the side of the unit. One of the four leads is connected to the vehicle ignition switch, one to the back-up lights or reverse switch 34 on the transmission, one to ground 44 and one to the alarm 26.

The audio alarm is preferably a solid state piezoelectric alarm capable of developing 80 decibels at 12 volts D.C.

In operation, the transceiver 20 is activated to transmit electromagnetic radiation whenever the vehicle ignition is on and the transmission is engaged in reverse gear. This closes the vehicle reverse switch 34 for illuminating the vehicle backup lights. A reducer may be provided between the transceiver 20 and reverse switch 34 to adjust the operating voltage to 8 volts D.C. The transceiver range spans the width of the vehicle 14 and extends rearwardly approximately 6 to 12 feet. The maximum range would be approximately 20 feet.

As the vehicle is driven rearwardly, reflected signals from any object within the transceiver range, such as loading dock 46, are picked up by antenna 22 and supplied to the mixer diode 30 where the frequency shift is measured electronically. Amplifier 24 is designed to amplify and shape the resultant doppler shift signal and to activate the alarm 26. Note that when the vehicle is backing up, both stationary and moving objects within the transceiver range will be detected since there will be relative movement between the transceiver and these objects. Even when the vehicle is stationary, a moving object, such as a running child, will be detected by the transceiver and result in activation of the alarm. A stationary object will not be detected when the vehicle is stationary since there is no relative movement to cause a doppler shift signal to be generated. Thus the alarm will stop once the moving object leaves the transceiver range. Likewise, when the buzzer is activated by a stationary object, it will stop once the vehicle is stopped.

Thus there has been shown and described a driver alerting device for a vehicle which accomplishes at least all of the stated objects.

I claim:

1. A driver alerting device for a vehicle having a back-up light circuit reverse switch, comprising a transceiver comprising a micro-wave radar device using the doppler shift principle to detect the presence of a target within the transceiver range, means for supporting said transceiver at the rearward end of a vehicle for directing the wave output thereof rearwardly of the vehicle, *said transceiver range being limited to a span substantially the width of the vehicle and extending a maximum of approximately 20 feet,* means for supplying to said transceiver return wave signals from any target within the transceiver range, [an intermediate frequency amplifier operatively connected to said transceiver, said amplifier being operative to amplify and shape said return wave signals,]

a remote indicator adapted for placement within or adjacent the passenger compartment of a vehicle,

[means for electrically connecting] said remote indicator *being coupled* to said transceiver for activation of said indicator in response to detection by said transceiver of return wave signals from any target within the transceiver range, and means for [electrically connecting] *coupling* said transceiver to the back-up light circuit reverse switch of a vehicle for activation of said transceiver in response to activation of said back-up light circuit reverse switch of a vehicle, said device being substantially unaffected, in operation, by varying weather conditions.

2. The driver alerting device of claim 1 wherein said transceiver includes a wave guide cavity and a gunn diode mounted in said wave guide cavity for transmitting wave output therefrom.

3. The driver alerting device of claim 2 wherein said transceiver further includes a schottky barrier mixer diode which is operative as the receiver thereof.

4. The driver alerting device of claim 1 wherein said means for supplying return wave signals to said transceiver comprises a high gain antenna.

5. The driver alerting device of claim 1 wherein said means for supplying return wave signals to said transceiver comprises a low gain antenna.

6. The driver alerting device of claim 1 wherein said means for supplying return wave signals to said transceiver comprises an antenna mounted directly to the transceiver.

7. The driver alerting device of claim 1 [wherein said] *further comprising an* intermediate frequency amplifier [is a solid state multistage operational amplifier] *operatively connected to said transceiver, said amplifier being operative to amplify and shape said return wave signals.*

8. The driver alerting device of claim 1 wherein said remote indicator comprises a solid state piezoelective alarm.

9. In combination, a vehicle having forward and rearward ends, a passenger compartment, and a back-up light circuit reverse switch, a driver alerting device, comprising a transceiver comprising a micro-wave radar device using the doppler shift principle to detect the presence of a target within the transceiver range,

*said transceiver range being limited to a span substantially the width of the vehicle and extending a maximum of approximately 20 feet,* means for supporting said transceiver on the rearward end of said vehicle for directing the wave output of the transceiver rearwardly of the vehicle, antenna means for supplying to the transceiver return wave signals from any target within the transceiver range, an indicator, means for mounting said indicator in the passenger compartment of the vehicle, means for electrically connecting said indicator to said transceiver for activation of said indicator in response to detection by said transceiver of return wave signals from any target within the transceiver range, said means for electrically connecting said indicator to said transceiver including an intermediate frequency amplifier operative to amplify and shape the output signal of said transceiver, and, means for electrically connecting said transceiver to the back-up light circuit reverse switch of the vehicle for activation of said transceiver in response to activation of said back-up light circuit reverse switch of the vehicle, said device being substantially unaffected, in operation, by varying weather conditions.

10. A driver alerting device for a vehicle having a transmission with a reverse gear, comprising, a transceiver comprising a micro-wave radar device using the Doppler shift principle to detect the presence of a target within the transceiver range, means for supporting said transceiver at the rearward end of a vehicle for directing the wave output thereof rearwardly of the vehicle, means for supplying to said transceiver return wave signals from any target within said transceiver range,

[an intermediate frequency amplifier operatively connected to said transceiver, said amplifier being operative to amplify and shape said return wave signals,]

*said transceiver range being limited to a span substantially the width of the vehicle and extending a maximum of approximately 20 feet,* a remote indicator adapted for placement within or adjacent the passenger compartment of a vehicle,

[means for electrically connecting] said remote indicator *being coupled* to said transceiver for activation of said indicator in response to detection by said transceiver of return wave signals from any target within the transceiver range, and means for activating said transceiver in response to actuation of said transmission to said reverse gear, said device being substantially unaffected, in operation, by varying weather conditions.

*11. The driver alerting device of claim 7 wherein said intermediate frequency amplifier is a solid state multistage operational amplifier.*

*12. A rear collision avoidance system operatively connected to a rear portion of a motor vehicle to detect the presence of objects behind said motor vehicle in response to relative motion between said motor vehicle and said objects, said rear collision avoidance system including,*

*micro-wave antenna means disposable at said vehicle rear portion for radiating micro-wave signals rearwardly of said vehicle in a wave pattern that spans substantially a rear width of said motor vehicle so as to have a lateral dimension substantially coextensive with said rear portion width of said motor vehicle, and for receiving micro-wave signals reflected from objects which are disposed behind said vehicle within said micro-wave pattern, said micro-wave antenna radiating micro-wave signals rearwardly of said vehicle a maximum of approximately 20 feet; micro-wave transceiver circuitry coupled to said antenna, said micro-wave transceiver circuitry having a range, said micro-wave transceiver circuitry including a source of micro-wave signals having a predetermined frequency, said micro-wave transceiver circuitry producing a doppler shift signal whenever an object moving relative to said vehicle and disposed within said wave pattern and within said range reflects a micro-wave signals toward said antenna with a frequency different from said predetermined frequency,*

*said micro-wave transceiver including an amplifier to amplify and shape said doppler shift signal to produce an alert signal; and*

*an indicator operatively connected to said micro-wave transceiver circuitry, for alerting an operator of said vehicle to the presence of said object in response to receipt of said alert signal.*

*13. The system of claim 12 wherein said transceiver range extends rearwardly of said vehicle rear portion approximately 6 to 12 feet.*

*14. The system of claim 12 wherein said transceiver range extends rearwardly of said vehicle rear portion up to a maximum of approximately 20 feet.*

*15. The system of claim 12 wherein said amplifier includes an adjustment which adjusts said transceiver range.*

*16. The system of claim 15 wherein said source of micro-wave signals has a power output of about 5 milliwatts.*

*17. The system of claim 12 wherein said micro-wave transceiver circuitry ceases to produce said doppler shift signal whenever relative movement between said object within said wave pattern and within said range and said vehicle ceases.*

*18. The system of claim 12 wherein said source of micro-wave signals comprises a gunn diode and said micro-wave transceiver circuitry includes a mixer element different from said gunn diode which produces said doppler shift signal.*

*19. In a motor vehicle having a rear portion and capable of moving over a road surface in a rearward direction, said rear portion having a lateral extent that establishes a rear width of said motor vehicle, the improvement comprising*

*a collision avoidance system operatively associated with said rear portion of said motor vehicle to detect the presence of an obstacle behind said motor vehicle in response to relative motion between said motor vehicle and said obstacle, and to alert the driver of the presence of said obstacle, said collision avoidance system including:*

*transceiver means positioned at said rear portion of said motor vehicle within said rear width thereof for (i) radiating micro-wave energy of a predetermined frequency rearwardly of said motor vehicle, said produced micro-wave energy conforming to a wave pattern that spans substantially said rear width of said motor vehicle so as to have a lateral dimension substantially coextensive with said rear width of said motor vehicle, and extending a maximum of approximately 20 feet, (ii) receiving micro-wave energy reflected by said obstacle, and (iii) in response to receiving said reflected micro-wave energy, generating an alarm signal, indicative of the presence of said obstacle, when said reflected micro-wave energy is of a frequency different from said predetermined frequency and said obstacle is within about 20 feet of said transceiver means; and*

*alarm means for alerting the motor vehicle operator to the presence of said obstacle in response to receipt of said generated alarm signal.*

*20. The motor vehicle of claim 19 wherein said transceiver means generates said alarm signal when said obstacle is within about 6 to 12 feet of said transceiver means.*

*21. The motor vehicle of claim 19 wherein said transceiver means has a micro-wave power output of about 5 milliwatts.*

*22. A process for alerting the drive of a vehicle, having a passenger compartment, an ignition and a transmission having a reverse gear, to the presence of any object in close range behind the vehicle, comprising:*

*providing a transceiver comprising a micro-wave radar device using the doppler shift principle at the rear end of said vehicle;*

*activating said transceiver to transmit micro-wave electromagnetic radiation in a wave pattern limited to a span the width of the vehicle and extending rearwardly a maximum of approximately 20 feet whenever the vehicle ignition is on and the transmission is engaged in reverse gear;*

*supplying reflected micro-wave electromagnetic signals, from any object within said wave pattern and within said transceiver range, to said transceiver; and*

*activating an alarm, located in said passenger compartment, when a doppler shift is detected by said transceiver.*

*23. A driver alerting device for a vehicle having a back-up light circuit reverse switch, comprising*

*a transceiver comprising a micro-wave radar device using the Doppler shift principle to detect the presence of a target within the transceiver range,*

*means for supporting said transceiver at the rearward end of a vehicle for directing the wave output thereof rearwardly of the vehicle, said transceiver range extends rearwardly approximately 6 to 12 feet,*

*means for supplying to said transceiver return wave signals from any target within the transceiver range, an intermediate frequency amplifier operatively connected to said transceiver, said amplifier being operative to amplify and shape said return wave signals,*

*a remote indicator adapted for placement within or adjacent the passenger compartment of a vehicle,*

*said remote indicator being coupled to said transceiver for activation of said indicator in response to detection by said transceiver of return wave signals from any target within the transceiver range, and*

*means for coupling said transceiver to the back-up light circuit reverse switch of a vehicle for activation of said transceiver in response to activation of said back-up light circuit reverse switch of a vehicle, said device being substantially unaffected, in operation, by varying weather conditions.*

*24. The driver alerting device of claim 23 wherein the transceiver range is about 20 feet.*

* * * * *